United States Patent
Chen et al.

(10) Patent No.: US 12,301,691 B2
(45) Date of Patent: May 13, 2025

(54) METHODS AND APPARATUS FOR MANAGING CACHING IN MOBILE EDGE COMPUTING SYSTEMS

(71) Applicant: Lenovo (Beijing) Ltd., Beijing (CN)

(72) Inventors: Wei Chen, Beijing (CN); Haiming Hui, Beijing (CN); Xin Guo, Beijing (CN); Haiming Wang, Beijing (CN)

(73) Assignee: Lenovo (Beijing) Ltd, Beijing (CN)

( * ) Notice: Subject to any disclaimer, the term of this patent is extended or adjusted under 35 U.S.C. 154(b) by 268 days.

(21) Appl. No.: 17/917,118

(22) PCT Filed: Apr. 10, 2020

(86) PCT No.: PCT/CN2020/084166
§ 371 (c)(1),
(2) Date: Oct. 5, 2022

(87) PCT Pub. No.: WO2021/203406
PCT Pub. Date: Oct. 14, 2021

(65) Prior Publication Data
US 2023/0164237 A1    May 25, 2023

(51) Int. Cl.
*H04L 67/568* (2022.01)
*H04L 67/101* (2022.01)

(52) U.S. Cl.
CPC .......... *H04L 67/568* (2022.05); *H04L 67/101* (2013.01)

(58) Field of Classification Search
CPC ..................................................... H04L 67/101
See application file for complete search history.

(56) References Cited

U.S. PATENT DOCUMENTS

2013/0080623 A1* 3/2013 Thireault ................ H04L 41/40
                                                        709/224
2017/0295132 A1* 10/2017 Li ........................ H04L 61/3015
(Continued)

FOREIGN PATENT DOCUMENTS

| CN | 102014053 A | 4/2011 |
| CN | 107872478 A | 4/2018 |
| WO | 2014184705 A1 | 11/2014 |

OTHER PUBLICATIONS

PCT/CN2020/084166, "International Preliminary Report on Patentability", PCT Application No. PCT/CN2020/084166, Oct. 20, 2022, 6 pages.
(Continued)

*Primary Examiner* — Clayton R Williams
(74) *Attorney, Agent, or Firm* — FIG. 1 Patents

(57) ABSTRACT

Embodiments of the present disclosure relate to methods and apparatus for managing caching in mobile edge computing systems. According to an embodiment of the present disclosure, a method includes: determining a caching policy for caching a group of content items in a plurality of edge nodes, wherein determining the cache policy comprises determining whether to cache a content item in an edge node at least based on a popularity of the content item and a latency between the edge node and a group of base stations; and transmitting a content indication to each edge node of the plurality of edge nodes based on the determined caching polity respectively, herein the content indication transmitted to a respective edge node comprises one or more identifiers corresponding to one or more content items determined to be cached in the respective edge node.

19 Claims, 8 Drawing Sheets

(56) References Cited

U.S. PATENT DOCUMENTS

2018/0278688 A1     9/2018  Gal et al.
2019/0052726 A1*    2/2019  Power .................... H04L 67/60

OTHER PUBLICATIONS

PCT/CN2020/084166, "International Search Report and Written Opinion", PCT Application No. PCT/CN2020/084166, Dec. 30, 2020, 7 pages.
Qualcomm Incorporated, "Selective Service Acceleration", 3GPP TSG-RAN WG3 Meeting #92, R3-161339, Nanjing, China [retrieved Oct. 26, 2022]. Retrieved from the Internet <https://www.3gpp.org/ftp/tsg_ran/WG3_lu/TSGR3_92/Docs/>., May 2016, 4 Pages.

* cited by examiner

METHODS AND APPARATUS FOR MANAGING CACHING IN MOBILE EDGE COMPUTING SYSTEMS

TECHNICAL FIELD

Embodiments of the present disclosure are related to wireless communication technology, and more particularly, related to methods and apparatuses for managing caching in mobile edge computing (MEC) systems.

BACKGROUND

With the development of MEC technology, many edge nodes (ENs) can be implemented at the network edge to cache popular content files. A user equipment (UE) can download content files from edge nodes that are much closer to the UE than a content provider in a cloud. Accordingly, the latency, backhaul traffic, and outage (which usually happens when the network congests) probability can be decreased, and a higher quality of service (QoS) can be achieved.

However, since the storage space of an EN is limited, only a small amount of content files can be cached at each EN. The core network can proactively push popular content files to ENs. When a UE requests a content file, if one or more ENs have cached the content file, then the EN closest to the UE can be selected to serve the UE. Content popularity may be different in different locations, and only a few content files may be popular almost everywhere. Thus, how to choose content files to be cached at each edge node becomes an important problem. In addition, multiple UEs may request content files simultaneously or almost simultaneously. In such a case, the problem concerning how to choose an appropriate EN to serve each UE is also needed to be resolved.

SUMMARY OF THE DISCLOSURE

One object of the present disclosure is to provide a method and an apparatus for managing caching in an MEC system.

According to an embodiment of the present disclosure, a method may include: determining a caching policy for caching a group of content items in a plurality of edge nodes, wherein determining the cache policy includes determining whether to cache a content item in an edge node at least based on a popularity of the content item and a latency between the edge node and a group of base stations; and transmitting a content indication to each edge node of the plurality of edge nodes based on the determined caching polity respectively, wherein the content indication transmitted to a respective edge node includes one or more identifiers corresponding to one or more content items determined to be cached in the respective edge node.

According to another embodiment of the present disclosure, a method may include: receiving a report including information on a latency between each edge node and a group of base stations; and clustering the plurality of edge nodes based on the latency between each edge node and the group of base stations.

According to another embodiment of the present disclosure, a method may include: receiving a request for a content item; and determining an edge node from a plurality of edge nodes to provide the content item based on the request and clustering information of the plurality of edge nodes, wherein the plurality of edge nodes are clustered at least based on a latency between each of the plurality of edge nodes and a group of base stations.

According to another embodiment of the present disclosure, a method may include: transmitting a report including information on a latency between an edge node and a group of base stations; and receiving a caching policy indicating at least one content item to be cached in the edge node.

According to yet another embodiment of the present disclosure, an apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions may cause the at least one processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

As the MEC technology develops, edge nodes (ENs) implemented at the network edge are supposed to cache popular content files so that UEs can efficiently access the requested content files.

Figure 1:
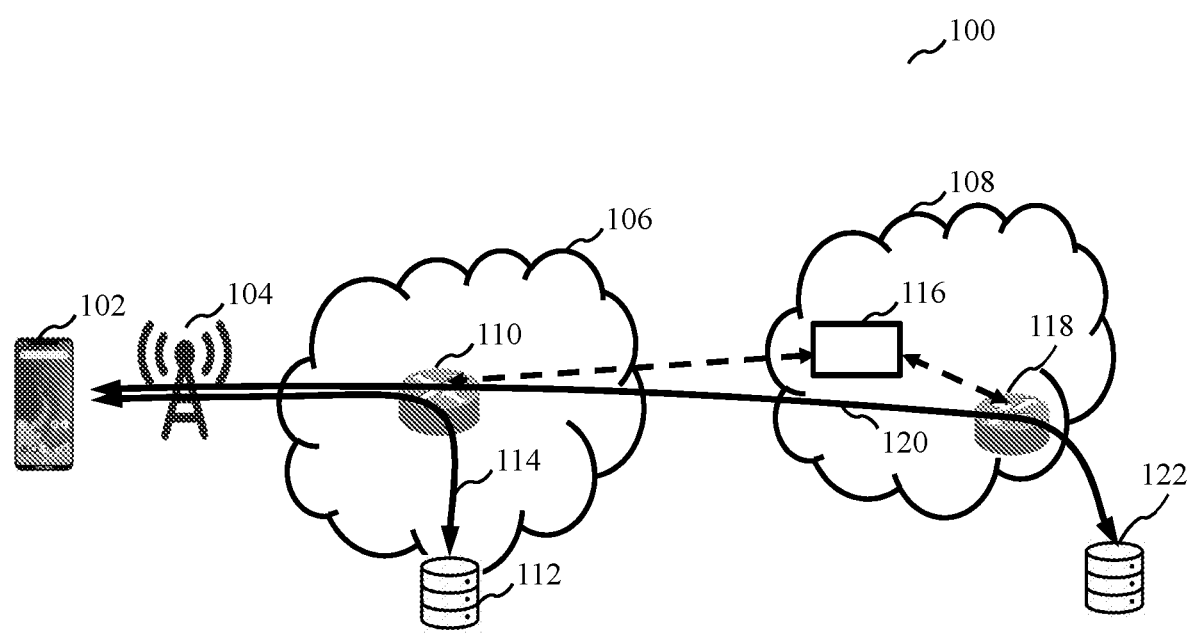
FIG. 1 illustrates an exemplary wireless communication system applying MEC technology in accordance with some embodiments of the present disclosure.

FIG. 1 illustrates an exemplary wireless communication system 100 applying MEC technology in accordance with some embodiments of the present disclosure. As shown in FIG. 1, a wireless communication system 100 may include a UE 102, a base station (BS) 104, an edge cloud 106, and a core network 108 (e.g., a 5G core network). Although one UE, one BS, and one edge cloud are depicted in FIG. 1, it is contemplated that the wireless communication system 100 may also include more UEs, more BSs, and more edge clouds. The UE 102 and the BS 104 may support communication based on, for example, 3G, LTE, LTE-advanced (LTE-A), new radio (NR), or other suitable protocol(s). For example, the embodiments of a BS 104 may include an eNB or a gNB. The embodiments of a UE 102 may include, for example, but is not limited to, a computing device, a wearable device, a mobile device, an IoT (Internet of Things) device, a vehicle, etc. Persons skilled in the art should understand that as technology develops and advances, the terminologies described in the present disclosure may change, but should not affect or limit the principles and spirit of the present disclosure.

The core network 108 may be connected with a content server 122 (also referred to as "a content provider") in a cloud (also referred to as "a network cloud"), e.g., via a user plane function (UPF) network element 118 in the core network 108. The core network 108 may also include a session management function (SMF) network element 116. The SMF network element 116 may communicate with a UPF network element in the core network 108, e.g., the UPF network element 118, in a control plane to establish, update, and/or delete a protocol data unit (PDU) session. The SMF network element 116 may also communicate with a UPF network element in an edge cloud, e.g., a UPF network element 110 in the edge cloud 106. For example, by communicating with the UPF network elements 110 and 118, the SMF network element 116 may establish a PDU session between the UPF network elements 110 and 118. Although one content server, one UPF network element, and one SMF network element are depicted in FIG. 1, it is contemplated that the wireless communication system 100 may also include more content servers connected with the core network 108 and more UPF network elements and more SMF network elements in the core network 108, wherein each UPF network element may be connected with one or more content servers. Also, the core network 108 may include other network elements not shown in FIG. 1, such as a network exposure function (NEF) network element or a policy control function (PCF) network element.

The edge cloud 106 is located at the edge of the core network 108 and thus is closer to the BS 104 than the network cloud. The edge cloud 106 may include a UPF network element 110 and an edge node (EN) 112 connected with the UPF network element 110. Although one UPF network element and one EN are depicted in FIG. 1, it is contemplated that the edge cloud 106 may also include more UPF network elements and more ENs, wherein each UPF network element may be connected with one or more ENs. Also, the edge cloud 106 may include other network elements not shown in FIG. 1, such as a building baseband unit (BBU) or a control unit (CU).

As shown in FIG. 1, the BS 104 can be connected with the core network 108 through the edge cloud 106. In other embodiments of the present disclosure, the BS 104 can be directly connected with the core network 108 without the edge cloud 106. The UE 102 can be connected with the edge cloud 106 through the BS 104, and can be connected with the core network 108 through the BS 104 and the edge cloud 106. In other embodiments of the present disclosure, the UE 102 can be connected with the core network 108 through the BS 104 without the edge cloud 106.

The content server 122 may store content items (or content files) that can be requested by the UE 102. The content may include multi-media files, text files, computing units, computing power, central processing unit (CPU), graphics processing unit (GPU), general-purpose graphics processing unit (GPGPU), or the like. The core network 108 may proactively push popular content items to the EN 112 and other EN(s) in the wireless communication system 100. Each EN may cache at least one of the popular content items according to a caching policy. According to some embodiments of the present disclosure, the caching policy may be at least based on a popularity of each content item and a latency between each EN and a group of BSs. According to other embodiments of the present disclosure, the caching policy may be based on a load capacity of each EN or a cluster of ENs.

When the UE 102 requests a content item, the UE 102 may send a request for the content item to the UPF network element 110 through the BS 104. The UPF network element 110 will try to discover (or select) an appropriate EN (e.g., the EN 112) that has cached the requested content item to serve the request. According to some embodiments of the present disclosure, the appropriate EN may be selected at least based on a latency between each EN and the UE 102 or a latency between each EN and a group of BSs. According to other embodiments of the present disclosure, the appropriate EN may be selected based on a load capacity (or a serving capacity) of each EN.

If an appropriate EN (e.g., the EN 112) is discovered, a communication path 114 can be established between the UE 102 and the appropriate EN 112. The appropriate EN 112 will then send the requested content item to the UE 102 via the communication path 114. Otherwise, a communication path 120 can be established between the UE 102 and the content server 122, and the content server 122 will then send the requested content item to the UE 102 via the communication path 120.

Figure 2:
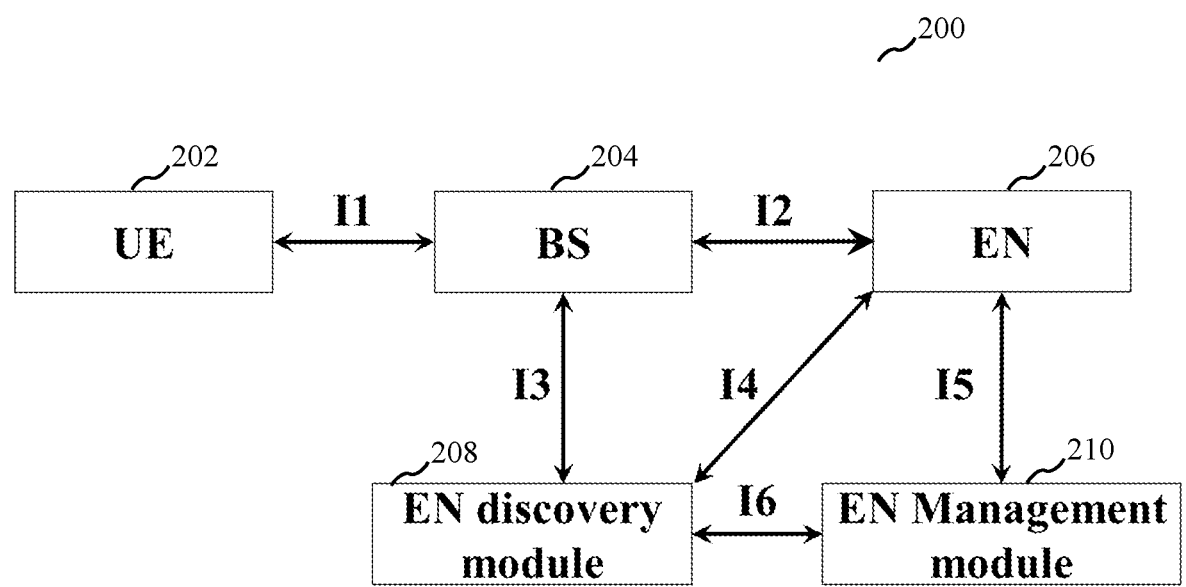
FIG. 2 illustrates an exemplary architecture of a wireless communication system applying MEC technology in accordance with some embodiments of the present disclosure.

FIG. 2 illustrates an exemplary architecture of a wireless communication system 200 applying MEC technology in accordance with some embodiments of the present disclosure. As shown in FIG. 2, the wireless communication system 200 may include a UE 202, a BS 204, an EN 206, an EN discovery module 208, and an EN management module 210. The UE 202 may be implemented as an example of the UE 102 in FIG. 1. The BS 204 may be implemented as an example of the BS 104 in FIG. 1. The EN 206 may be implemented as an example of the EN 112 in FIG. 1. The EN discovery module 208 and the EN management module 210 may be implemented in an UPF network element, such as the UPF network element 110 in FIG. 1. According to some embodiments of the present disclosure, the EN discovery module 208 and the EN management module 210 may be implemented in a single UPF network element. According to other embodiments of the present disclosure, the EN discovery module 208 and the EN management module 210 may be separately implemented in different UPF network elements. According to other embodiments of the present disclosure, at least one of the EN discovery module 208 and the EN management module 210 may be distributedly implemented in a plurality of UPF network elements throughout the wireless communication system 200.

In some embodiments of the present disclosure, the EN management module 210 may determine a caching polity for ENs (e.g., the EN 206) at least based on a popularity of each potential content item to be cached and a latency between each EN and a group of BSs (e.g., the BS 204). The group of BSs may include at least one BS located in a given area. According to an embodiment of the present disclosure, the EN management module 210 may request an EN (e.g., the EN 206) to measure and report the latency between the EN and the group of BSs. According to another embodiment of the present disclosure, the EN 206 may actively report the latency between the EN 206 and the group of BSs to the EN management module 210, without a request from the EN management module 210. After receiving the latency report from the EN 206, the EN management module 210 may update the caching policy correspondingly.

The EN management module 210 may also cluster the ENs based on the latency between each EN and a group of BSs. After receiving the latency report from the EN 206, the EN management module 210 may also update the clustering of ENs. As will be described in detail below, the EN management module 210 may determine a caching policy for ENs prior to clustering the ENs. Additionally or alternatively, the EN management module 210 may determine a caching policy for ENs after clustering the ENs and based on a result of the clustering.

In some embodiments of the present disclosure, the EN discovery module 208 may obtain the clustering information of ENs from the EN management module 210, and use the clustering information for discovering an appropriate EN to serve a UE's request for a content item. When the EN discovery module 208 receives a request from a UE (e.g., the UE 202) for a content item, the EN discovery module 208 may send a request for the clustering information of ENs to the EN management module 210, and the EN management module 210 may send the clustering information to the EN discovery module 208 in response to the EN discovery module 208's request. Additionally or alternatively, the EN management module 210 may actively provide the clustering information of ENs to the EN discovery module 208 after clustering the ENs, without a request form the EN discovery module 208.

After receiving a request from a UE (e.g., the UE 202) for a content item, the EN discovery module 208 may determine which EN(s) nearby have cached the requested content item based on a caching policy received from the EN management module 210. The EN discovery module 208 may select an appropriate EN that has cached the requested content item and has a serving capacity sufficient to provide the requested content item to the UE. If no nearby EN has cached the requested content item or no nearby EN has a sufficient serving capacity, the EN discovery module 208 may inform the content server (e.g., the content server 122 in FIG. 1) which stores the requested content item to serve the UE's request. The procedure of discovering an appropriate EN to serve the UE's request will be described in detail below.

According to some embodiments of the present disclosure, I1 in FIG. 2 represents interactions (direct or indirect) between the UE 202 and the BS 204. For example, when the UE 202 requests a content item, it sends a request to the serving BS 204 to handle the request. When the BS 204 receives information of the requested content item from either an EN or a content provider, it transmits the information to the UE 202.

I2 in FIG. 2 represents interactions (direct or indirect) between the BS 204 and the EN 206. For example, when the EN 206 is selected to serve the request of the UE 202 and the information (such as address) of the EN 206 is delivered to the UE 202, the UE 202 will access EN 206 via the BS 204 and the EN 206 transmits the content item requested by the UE 202 to the BS 204.

I3 in FIG. 2 represents interactions (direct or indirect) between the BS 204 and the EN discovery module 208. For example, the BS 204 sends a UE's request to the EN discovery module 208 to discover an appropriate EN to serve the request. The UE's request may also indicate a preferential EN, which is selected by the UE according to historical information. In some embodiments of the present disclosure, the preferential EN is an EN with the minimal latency to the UE. In other embodiments of the present disclosure, the preferential EN is an EN with the highest QoS. After completing the procedure of discovering an appropriate EN, the EN discovery module 208 informs the BS 204 which EN is selected and whether the EN is the one with the minimal latency.

I4 in FIG. 2 represents interactions (direct or indirect) between the EN 206 and the EN discovery module 208. For example, the EN discovery module 208 may request an EN 206 to report the current serving capability of the EN 206, thereby determining whether the EN 206 can serve the UE's request. When the EN discovery module 208 selects the EN 206 to serve the UE's request, it may inform the selected EN 206 about which content item is requested and which BS the request content item should be transmitted to.

I5 in FIG. 2 represents interactions (direct or indirect) between the EN 206 and the EN management module 210. For example, the EN 206 may report at least one of the latency to a UE or the latency to a group of BSs to the EN management module 210 actively or in response to a request of the EN management module 210. The EN 206 may also report to the EN management module 210 a content list including at least one of: an identifier and storage time of each content item cached in the EN 206, and an average lifetime of content items cached in the EN 206 during a given time period, in response to a request of the EN management module 210. When the caching policy is updated by the EN management module 210, the EN management module 210 informs the EN 206 to update the cache accordingly. According to some embodiments, the EN management module 210 may also provide the clustering information to the EN 206.

I6 in FIG. 2 represents interactions (direct or indirect) between the EN discovery module 208 and the EN management module 210. For example, when the EN management module 210 updates the caching policy, it provides the updated caching policy to the EN discovery module 208, so that the EN discovery module 208 can get the latest cache states. The EN management module 210 may also provide the clustering information of ENs to the EN discovery module 208.

Below will describe exemplary signaling procedures between the modules or apparatuses in the wireless communication system 100 or 200 in detail.

Figure 3:
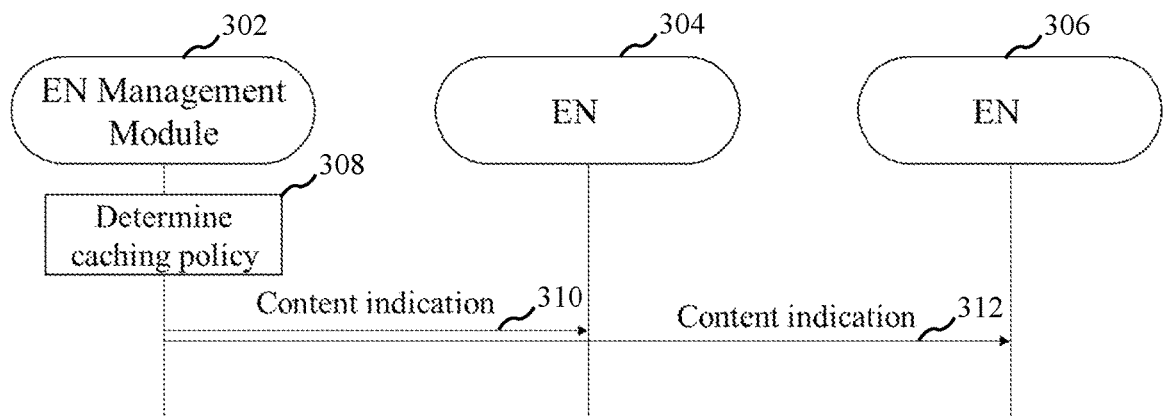
FIG. 3 illustrates an exemplary signaling procedure for making a caching policy between an EN management module and a plurality of ENs in accordance with some embodiments of the present disclosure.

FIG. 3 illustrates an exemplary signaling procedure for making a caching policy between an EN management module 302 and a plurality of ENs in accordance with some embodiments of the present disclosure. Although two ENs 304 and 306 are depicted in FIG. 3, it is contemplated that the EN management module 302 can make a caching policy for fewer or more ENs.

In step 308, the EN management module 302 determines a caching policy for caching a group of content items in a plurality of ENs (e.g., ENs 304 and 306). According to embodiments of the present disclosure, the caching policy is selected to minimize both the average latency and the average traffic load of the plurality of ENs. In some embodiments of the present disclosure, determining the cache policy includes, for each EN (e.g., EN 304 or 306), determining whether to cache a content item in the EN at least based on a popularity of the content item and a latency between the EN and a group of BSs.

According to an embodiment of the present disclosure, the cache policy can be determined by minimizing a value R of an objective function that represents the effect of average latency and traffic load. One example of the objective function may be $\overline{D} + \alpha \Sigma_{m=1}^{M} \phi(G_m)$, wherein $\overline{D}$ represents the average latency of a total of M ENs, $G_m$ represents the average traffic load at the $m^{th}$ EN of the M ENs, $\alpha$ represents an adjusting coefficient, and $\phi(G_m)$ represents a function of Gm, such as a linear function, quadratic function, etc. For example, in K time slots, there are F content items that may be requested by N UEs. Each of the M ENs can store at most L content items (L<F). The latency from the $m^{th}$ EN to the $n^{th}$ UE is denoted by $d_{m,n}$. The probability that the $n^{th}$ UE requests the $f^{th}$ content item is denoted by $p_{n,f}$. Let an M×F matrix, $A_{M \times F}$, denote a caching policy. The element in the $m^{th}$ row and $f^{th}$ column of $A_{M \times F}$ is $A_{m,f}$. $A_{m,f}$ has a value of either 1 or 0. $A_{m,f}=1$ means that the $f^{th}$ content item is cached in the $m^{th}$ EN. $A_{m,f}=0$ means that the $f^{th}$ content item is not cached in the $m^{th}$ EN. Let $y_{n,f,m}=1$ denotes that when the $n^{th}$ UE requests the $f^{th}$ content item, the available EN caching the $f^{th}$ content item with the lowest latency is the $m^{th}$ EN. Let $y_{n,f,m}=0$ denotes that when the $n^{th}$ UE requests the $f^{th}$ content item, the available EN caching the $f^{th}$ content item with the lowest latency is not the $m^{th}$ EN. The average latency of the M ENs can be given by $\overline{D} = \Sigma_{n=1}^{N} \Sigma_{f=1}^{F} p_{n,f} \Sigma_{m=1}^{M} y_{n,f,m} d_{m,n}$. The average traffic load at the $m^{th}$ EN can be defined to be the average number of requests served by the $m^{th}$ EN per slot, which is given by $G_m = \Sigma_{n=1}^{N} \Sigma_{f=1}^{F} p_{n,f} y_{n,f,m}$. It should be understood that the objective function, $\overline{D}$, and $G_m$ may have other forms, which are within the scope of the present disclosure. Minimizing the objective function may consider minimizing the average latency while balancing the traffic load for all ENs.

According to an embodiment of the present disclosure, the caching policy can be determined through the following steps:

Step 1.1: initializing a value R of the objective function by assuming that all UE requests are served by the content server, i.e., no content item is cached in the ENs.

Step 1.2: computing a value R' of the objective function for a candidate caching policy. The following Table 1 shows an exemplary caching policy, which may be represented by an M×F matrix, $A_{M \times F}$ (in this example, M=5, F=10). The element in the $m^{th}$ row and $f^{th}$ column of $A_{M \times F}$ is $A_{m,f}$. $A_{m,f}$ has a value of either 1 or 0. $A_{m,f}=1$ means that the $f^{th}$ content item, $F_f$, is cached in the $m^{th}$ EN, $EN_m$. $A_{m,f}=0$ means that the $f^{th}$ content item, $F_f$, is not cached in the $m^{th}$ EN, $EN_m$.

TABLE 1

| EN | Content item | | | | | | | | | |
|---|---|---|---|---|---|---|---|---|---|---|
| | $F_1$ | $F_2$ | $F_3$ | $F_4$ | $F_5$ | $F_6$ | $F_7$ | $F_8$ | $F_9$ | $F_{10}$ |
| $EN_1$ | 1 | 0 | 0 | 0 | 1 | 1 | 0 | 0 | 1 | 0 |
| $EN_2$ | 0 | 1 | 0 | 1 | 0 | 0 | 0 | 0 | 1 | 1 |
| $EN_3$ | 0 | 0 | 1 | 1 | 0 | 0 | 1 | 0 | 0 | 1 |
| $EN_4$ | 0 | 1 | 0 | 0 | 1 | 0 | 0 | 1 | 1 | 0 |
| $EN_5$ | 1 | 1 | 0 | 0 | 0 | 1 | 1 | 0 | 0 | 0 |

Step 1.3: if R>R', computing a gain of the candidate caching policy as g=R−R' and let R=R'; otherwise, discarding R'.

Step 1.4: for all the candidate caching policies, repeating steps 1.2 and 1.3 until g is below a predetermined threshold. Then, the candidate caching policy corresponding to R is selected. In another embodiment of the present disclosure, step 1.4 may be performed until M*L candidate caching policies have been searched.

Referring back to FIG. 3, after the EN management module 302 determines a caching policy, in steps 310 and 312, the EN management module 302 transmits a content indication to each EN (e.g., ENs 304 and 306) based on the determined caching polity respectively. The content indication transmitted to a respective EN may include one or more identifiers corresponding to one or more content items determined to be cached in the respective EN. According to some embodiments of the present disclosure, the EN management module 302 may also transmit the determined caching policy to an edge node discovery module (e.g., the edge node discovery module 208).

Figure 4:
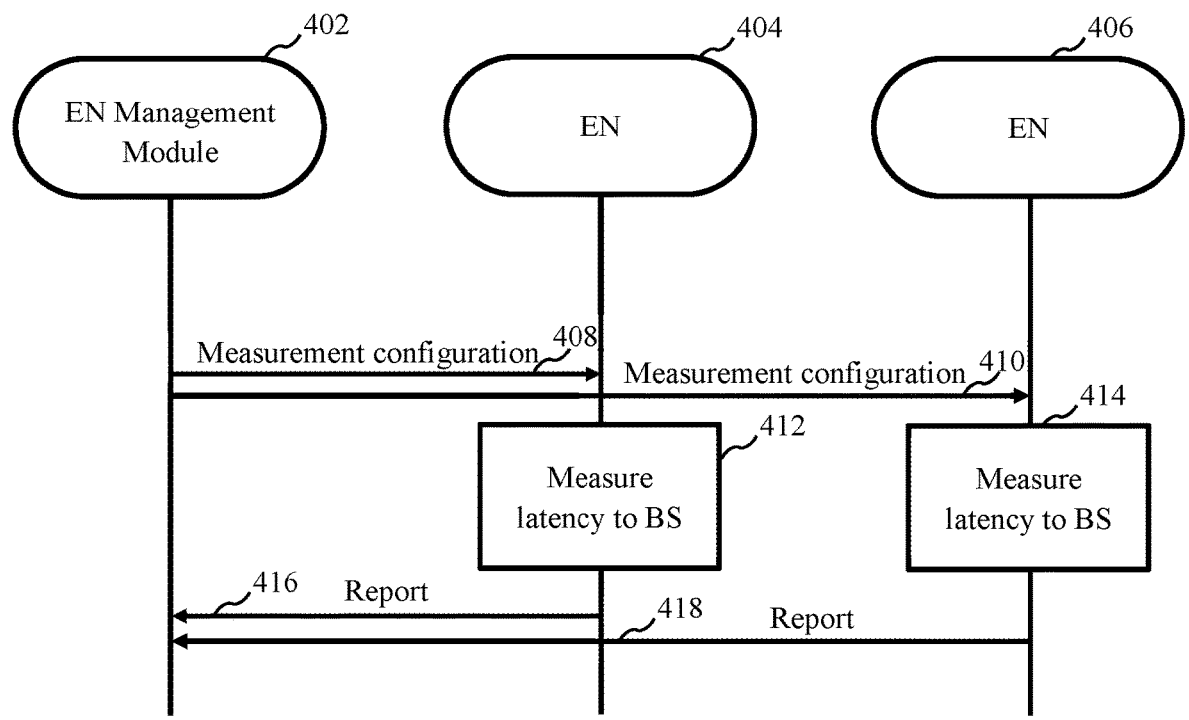
FIG. 4 illustrates an exemplary signaling procedure for latency measurement and reporting between an EN management module and a plurality of ENs in accordance with some embodiments of the present disclosure.

FIG. 4 illustrates an exemplary signaling procedure for latency measurement and reporting between an EN management module 402 and a plurality of ENs in accordance with some embodiments of the present disclosure. The measured and reported latency may be used in clustering the ENs. Additionally or alternatively, the latency may be used in updating EN feature information at the EN management module 402. Although two ENs 404 and 406 are depicted in FIG. 4, it is contemplated that fewer or more ENs can be involved in the procedure. In addition, the latency measurement and reporting procedure between an EN management module 402 and an EN, e.g., EN 404, is independent from others, e.g., the latency measurement and reporting procedure between an EN management module 402 and EN 406.

In steps 408 and 410, the EN management module 402 transmits a request for latency measurement and reporting to each of a plurality of ENs (e.g., ENs 404 and 406) respectively. In this example, the request includes a measurement configuration for clustering. The measurement configuration may indicate a group of BSs, which may be at least one BS located in a given area. In steps 412 and 414, the ENs 404 and 406 measure a latency to the at least one BS respectively. According to some embodiments of the present disclosure, the latency may be measured by sending a signal to the at least one BS, receiving a feedback from the at least one BS, and calculating the latency between the transmission of the signal and the receipt of the feedback. In an embodiment of the present disclosure, the latency between an EN and at least one BS may include a latency between the EN and a BS of the at least one BS. In another embodiment of the present disclosure, the latency between an EN and at least one BS may include an average latency between the EN and all the at least one BS. In steps 416 and 418, the ENs 404 and 406 report the measured latency to the EN management module 402 respectively.

Figure 5:
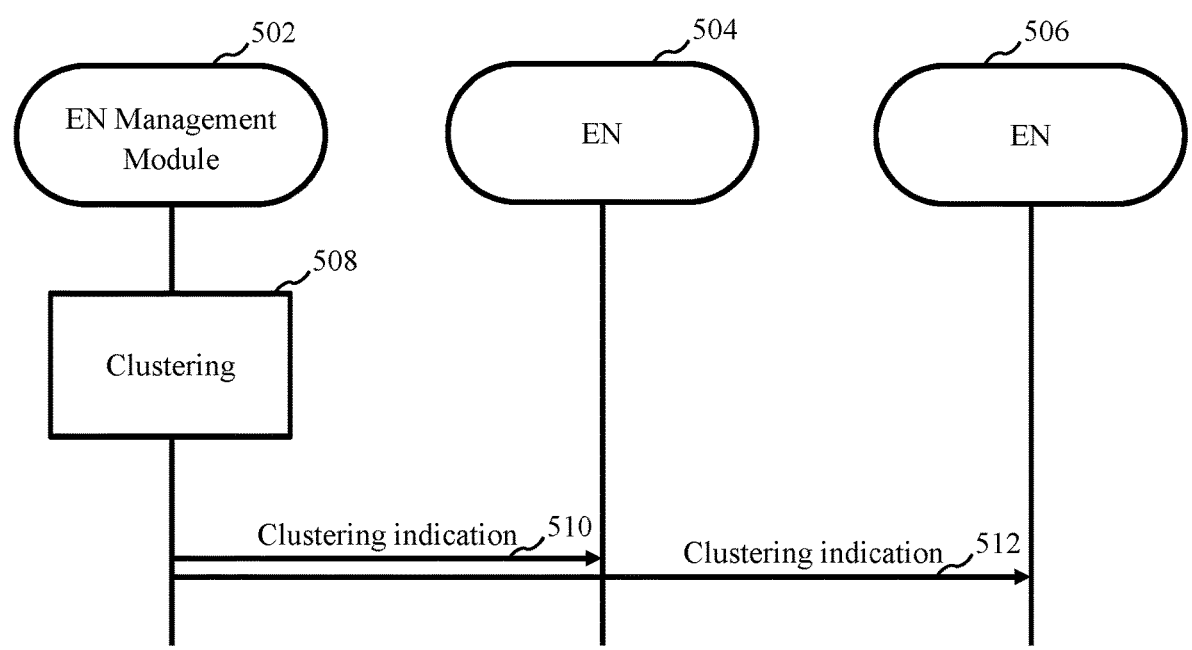
FIG. 5 illustrates an exemplary signaling procedure for EN clustering between an EN management module and ENs in accordance with some embodiments of the present disclosure.

FIG. 5 illustrates an exemplary signaling procedure for EN clustering between an EN management module 502 and ENs 504 and 506 in accordance with some embodiments of the present disclosure. Although two ENs are depicted in FIG. 5, it is contemplated that the EN management module 502 can cluster fewer or more ENs.

In step 508, the EN management module 502 clusters a plurality of ENs (e.g., ENs 504 and 506) based on a latency between each EN of the plurality of ENs and a group of BSs, such that ENs with close latencies are clustered into the same cluster. The latency between each EN and the group of BSs can be obtained from latency reports from the ENs, e.g., the reports received in steps 416 and 418 in response to the request of the EN management module 402. Additionally or alternatively, the ENs may actively send latency reports to the EN management module, e.g., periodically.

In steps 510 and 512, the EN management module 502 transmits a clustering indication to each EN (e.g., ENs 504 and 506) respectively, wherein the clustering indication transmitted to a respective EN may include a cluster identifier of a cluster to which the respective EN belongs. In some embodiments of the present disclosure, steps 510 and 512 are optional. That is, the EN management module 502 may maintain the clustering information (i.e., information on the cluster to which each EN belongs) without transmitting a clustering indication to the ENs. According to some embodiments of the present disclosure, the EN management module 502 may transmit the clustering information to an EN discovery module (e.g., the EN discovery module 208).

Figure 6:
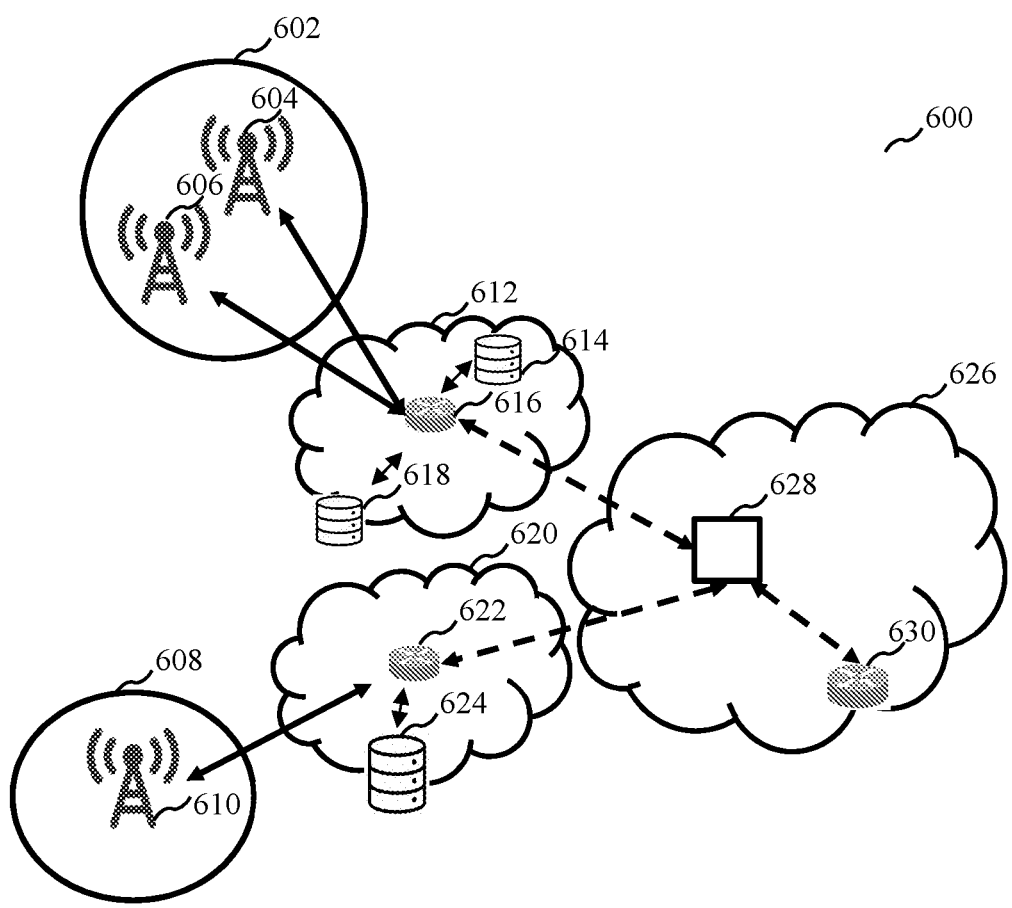
FIG. 6 illustrates an exemplary EN clustering procedure in a wireless communication system in accordance with some embodiments of the present disclosure.

FIG. 6 illustrates an exemplary EN clustering procedure in a wireless communication system 600 in accordance with some embodiments of the present disclosure. Similar to the wireless communication system 100 in FIG. 1, the wireless communication system 600 may include one or more BSs (e.g., BSs 604 and 606 located within an area 602, and BS 610 located within an area 608), one or more edge clouds (e.g., edge clouds 612 and 620), and a core network 626. The BSs 604 and 606 can be connected with the core network 626 through the edge cloud 612. The BS 610 can be connected with the core network 626 through the edge cloud 620. The core network 626 may include an SMF network element 628 and a UPF network element 630. The edge clouds 612 may include a UPF network element 616 and ENs 614 and 618. The edge clouds 620 may include a UPF network element 622 and an EN 624. The SMF network element 628 may communicate with the UPF network elements 616, 622, and 630. The UPF network element 616 may communicate with the BSs 604 and 606 and the ENs 614 and 618. The UPF network element 622 may communicate with the BS 610 and the EN 624. It should be understood that the wireless communication system 600 may also include other network elements not shown in FIG. 6.

According to an embodiment of the present disclosure, a plurality of ENs (e.g., the ENs 614, 618, and 624) can be clustered based on their latencies to a BS (e.g., the BS 610). For example, the clustering procedure may include the following steps:

Step 2.1: initializing a cluster C0 as null.

Step 2.2: randomly selecting an EN (e.g. the EN 624) as a reference EN and adding the EN 624 to the cluster C0. The latency between the BS 610 and the EN 624 is denoted by $L_{b1,e1}$.

Step 2.3: checking one of other ENs (e.g. the EN 618) by comparing the value of $|L_{b1,e2}-L_{b1,e1}|$ with a predefined threshold $L_{bias}$, wherein $L_{b1,e2}$ represents the latency between the BS 610 and the EN 618. If $|L_{b1,e2}-L_{b1,e1}|<L_{bias}$, then the EN 618 is added to the cluster C0; otherwise, the EN 618 is discarded. In the example shown in FIG. 6, the latency between the EN 618 and the BS 610 is much larger than that between the EN 624 and the BS 610, so the EN 618 cannot be added to the cluster C0.

Step 2.4: performing step 2.3 for the remaining EN(s) until all EN(s) have been checked, and outputting the cluster C0 as one cluster of ENs. In the example shown in FIG. 6, the EN 614 cannot be added to the cluster C0 due to the latency to the BS 610 larger than that of EN 624, either.

Step 2.5: performing step 2.1 to step 2.4 for other clusters Ci by selecting a different reference EN of the plurality of ENs iteratively until each EN of the plurality of ENs is clustered into a certain cluster Ci. In the example shown in FIG. 6, all three ENs can be clustered into two clusters: a first cluster C0 including the EN 624, and a second cluster C1 including the ENs 618 and 614.

According to another embodiment of the present disclosure, a plurality of ENs (e.g., the ENs 614, 618, and 624) can be clustered based on their latencies to a group of multiple BSs within a given area (e.g., the group of the BSs 604 and 606, denoted by group 2). For example, the clustering procedure may include the following steps:

Step 3.1: initializing a cluster C0 as null.

Step 3.2: randomly selecting an EN (e.g. the EN 618) as a reference EN and adding the EN 618 to the cluster C0. The latency between the group 2 and the EN 618 is denoted by $L_{g2,e2}$. In some embodiments of the present disclosure, $L_{g2,e2}$ can be defined as a latency between the EN 618 and a BS (e.g., the BS 606) in the group 2, e.g., $L_{g2,e2}=L_{b2,e2}$. In other embodiments of the present disclosure, $L_{g2,e2}$ can be defined as an average latency between the EN 618 and all the BSs in the group 2, e.g., $L_{g2,e2}=(L_{b2,e2}+L_{b3,e2})/2$, wherein $L_{b3,e2}$ represents a latency between the EN 618 and the BS 604.

Step 3.3: checking one of other ENs (e.g. the EN 614) by comparing the value of $|L_{g2,e2}-L_{g2,e3}|$ with a predefined threshold $L_{bias}$, wherein $L_{g2,e3}$ represents the latency between the group 2 and the EN 614. If $|L_{g2,e2}-L_{g2,e3}|<L_{bias}$, then the EN 614 is added to the cluster C0; otherwise, the EN 614 is discarded. In the example shown in FIG. 6, the latency between the EN 614 and the group 2 is comparable to that between the EN 618 and the group 2, so the EN 614 is added to the cluster C0.

Step 3.4: performing step 3.3 for the remaining EN(s) until all EN(s) have been checked, and outputting the cluster C0 as one cluster of ENs. In the example shown in FIG. 6, the EN 624 cannot be added to the cluster C0 due to the latency to group 2 larger than that of EN 618.

Step 3.5: performing step 3.1 to step 3.4 for other clusters Ci by selecting a different reference EN of the plurality of ENs iteratively until each EN of the plurality of ENs is clustered into a certain cluster Ci. In the example shown in FIG. 6, all three ENs can be clustered into two clusters: a first cluster C0 including the ENs 618 and 614, and a second cluster C1 including the EN 624.

The above specific steps for clustering the ENs are provided for purposes of illustration. It should be understood that the ENs can be clustered based on a latency between each EN and a group of BSs by other methods, which are within the scope of the present disclosure.

In some embodiments of the present disclosure, the procedure of EN clustering is performed after the procedure of making a caching policy. In other embodiments of the present disclosure, the procedure of EN clustering is performed prior to the procedure of making a caching policy. In such cases, the caching policy can be selected based on a popularity of each content item and a result of the procedure of EN clustering. For example, the EN management module may first consider a cluster of ENs as a segment and determine which content items should be cached in the segment; and the EN management module may determine which of the determined content items for each segment should be cached in each EN within the segment. According to an embodiments of the present disclosure, the caching policy can be determined through the following steps:

Step 4.1: performing step 1.1 to step 1.4 to determine which content items should be cached in each cluster of ENs based on a popularity of each content item and a latency between each cluster of ENs and a group of BSs. Each cluster of ENs is regarded as a large EN. The latency between a cluster of ENs and a group of BSs may be defined to be a minimal latency among the latencies between ENs in the cluster of ENs and the group of BSs. In some embodiments of the present disclosure, the objective function to be minimized in step 4.1 may change to $\overline{D}+\alpha\Sigma_{m=1}^{M}\phi(G_m)-\beta\Sigma_{m=1}^{M}X_m$, wherein β represents a second adjusting coefficient, and Xm represents the number of extra copies of a content item in the $m^{th}$ large EN. This is because more than one copy of a content item can be cached in the large EN and the extra copies can provide more serving capacity, hence reducing the probability that the large EN cannot serve a UE's request due to full serving capacity.

Step 4.2: performing step 1.1 to step 1.4 to determine which of the content items determined to be cached in each cluster should be cached in each EN within the cluster. In step 4.2, each EN is regarded as an independent one, and the caching policy is made with respect to the content items determined to be cached in each cluster in step 4.1.

The above specific steps for making a caching policy are provided for purposes of illustration. It should be understood that the caching policy can be determined by other methods, which are within the scope of the present disclosure.

In order to obtain the latest EN feature information (such as the latency information of the ENs, information on content items cached in the ENs, etc.) to update the caching policy and/or EN clustering, the EN management module may trigger an update of EN feature information periodically or in response to certain events, such as when a hit rate that the requested content items can be found in ENs has decreased. When the EN management module needs to update the EN feature information, it may perform the procedure as shown in FIG. 4 to obtain the latency information of the ENs. According to some embodiments of the present disclosure, in addition to the latency information, the EN management module may also request a content list from the ENs.

Figure 7:
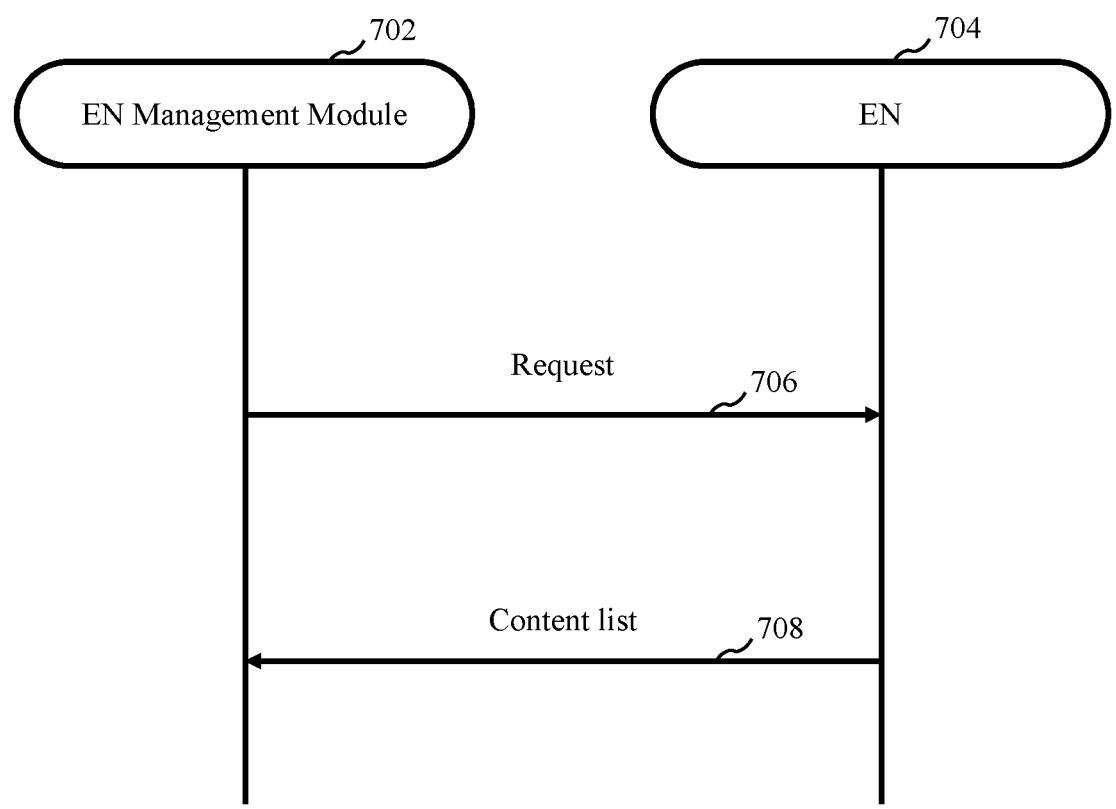
FIG. 7 illustrates an exemplary signaling procedure for content list reporting between an EN management module and an EN in accordance with some embodiments of the present disclosure.

FIG. 7 illustrates an exemplary signaling procedure for content list reporting between an EN management module 702 and an EN 704 in accordance with some embodiments of the present disclosure. Although only one EN is depicted in FIG. 7, it is contemplated that more ENs can be involved in the procedure.

In step 706, the EN management module 702 transmits a request for content list reporting to an EN (e.g., the EN 704). In step 708, the EN 704 transmits a content list to the EN management module 702 as a response. The content list may include at least one of: an identifier and storage time of each content item cached in the EN 704, and an average lifetime of content items cached in the EN 704 during a given time period. Since content items may become increasingly unpopular as the storage time approaches the lifetime, the request probability is affected by the storage time. On one hand, the information contained in the content list can facilitate load balance. On the other hand, it can be used to provide a quick determination of caching contents update in a cluster.

According to some embodiments of the present disclosure, the EN management module may request both the latency information and the content list in a single request. The requested EN may transmit the latency information and the content list in a single response or in multiple separated responses. In some embodiments of the present disclosure, the EN management module may transmit the received EN feature information to an EN discovery module.

Figure 8:
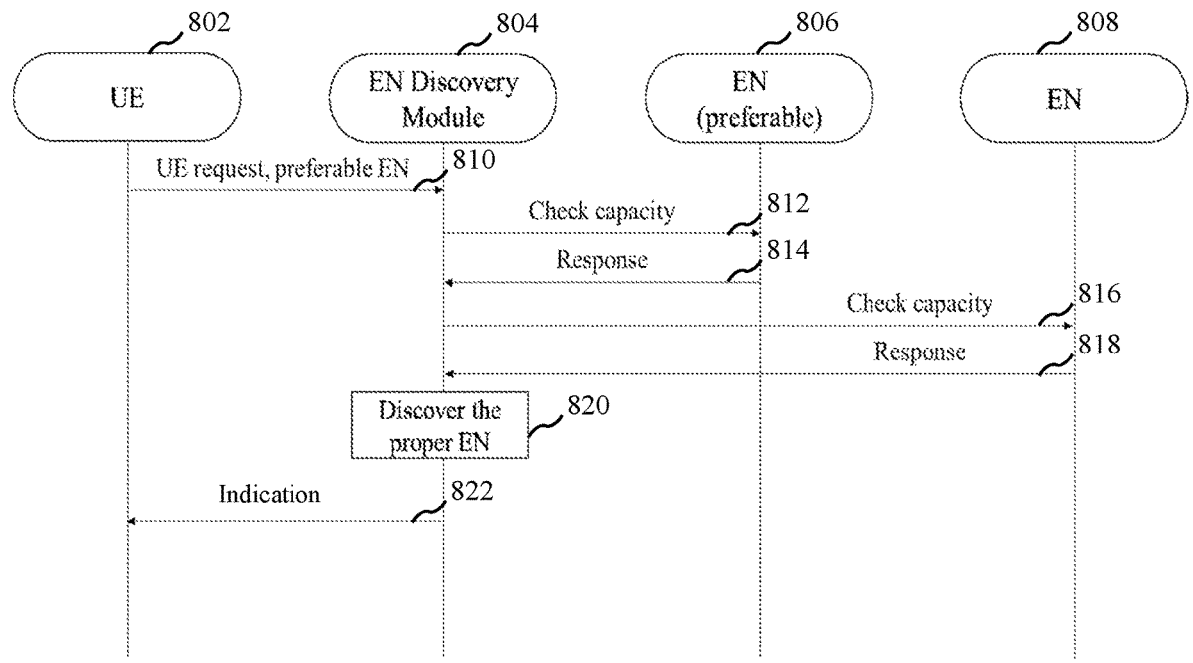
FIG. 8 illustrates an exemplary signaling procedure for EN discovery between an UE, an EN discovery module, and ENs in accordance with some embodiments of the present disclosure.

FIG. 8 illustrates an exemplary signaling procedure for EN discovery between an UE 802, an EN discovery module 804, and ENs 806 and 808 in accordance with some embodiments of the present disclosure. The procedure is performed to determine (or discover) an appropriate EN (or a proper EN) to serve a request of the UE 802 for a content item. Although two ENs are depicted in FIG. 8, it is contemplated that fewer or more ENs can be involved in the procedure.

In step 810, the UE 802 transmits a request for a content item to the EN discovery module 804. The request may be transmitted to the EN discovery module 804 through a BS. The request may indicate a preferential EN (e.g., the EN 806, also referred to as a candidate EN), which is selected by the UE 802 according to historical information. In response to receiving the request, the EN discovery module 804 determines whether the content item is cached in the preferential EN 806 based on the caching policy or feature information of the preferential EN 806, which was received from an EN management module. When it is determined that the content item is cached in the preferential EN 806, the EN discovery module 804 transmits a request to check a serving capacity of the preferential EN 806, in step 812. In an embodiment of the present disclosure, the EN discovery module 804 may forward the request received from the UE 802 to the preferential EN 806 to check the serving capacity of the preferential EN 806. In step 814, the preferential EN 806 transmits a response to the EN discovery module 804, indicating the remaining serving capacity or whether the serving capacity of the preferential EN 806 is sufficient to serve the request of the UE 802. In response to receiving a response from the preferential EN 806 indicating that the serving capacity of the preferential EN 806 is sufficient to serve the request of the UE 802, the EN discovery module 804 may determine the preferential EN 806 to provide the content item requested by the UE 802, in step 820.

When it is determined that the content item is not cached in the preferential EN 806 or in response to receiving a response from the preferential EN 806 indicating that the serving capacity of the preferential EN 806 is not sufficient to serve the request of the UE 802, the EN discovery module 804 may determine the EN(s) which are in the same cluster as the preferential EN 806 and has cached the requested content item based on clustering information previously provided by an EN management module and the caching policy. The EN discovery module 804 may alternatively transmit a request for the clustering information to the EN management module after receiving the request from the UE 802. The EN discovery module 804 may then transmit a request to part or all of the determined EN(s) (e.g., the EN 808) to check their serving capacities, in step 816. In step 818, the determined EN(s) (e.g., the EN 808) transmits a response to the EN discovery module 804, indicating the remaining serving capacity or whether the serving capacity is sufficient to serve the request of the UE 802. When the response from one or more ENs indicates that the one or more ENs has a serving capacity sufficient to serve the request of the UE 802, the EN discovery module 804 may select, in step 820, an appropriate EN from the one or more ENs to provide the content item to the UE 802. For example, the appropriate EN may be the one with a maximum value of an objective function $V_m = -d_{m,n} - \alpha\phi(G_m)$, which represents that the EN with a lower latency and more serving capacity should be selected.

When no EN in the same cluster as the preferential EN 806 can serve the request of the UE 802, the EN discovery module 804 may check all the other ENs to see whether any of them can serve the request, and select an appropriate EN (e.g., the one with a maximum value of the objective function) from the EN(s) capable of serving the request in step 820. When no EN can serve the request, the EN discovery module 804 determines the content server which stores the requested content item to serve the request.

After determining the appropriate EN or the content server to serve the request, in step 822, the EN discovery module 804 transmits an indication to the UE 802, informing that the request is served by the appropriate EN or the content server. The EN discovery module 804 may also inform the appropriate EN or the content server to provide the request content item to the UE 802. According to embodiments of the present disclosure, clustering the ENs and performing the EN discovery procedure based on the EN clustering information can make the EN discovery procedure more efficient.

Figure 9:
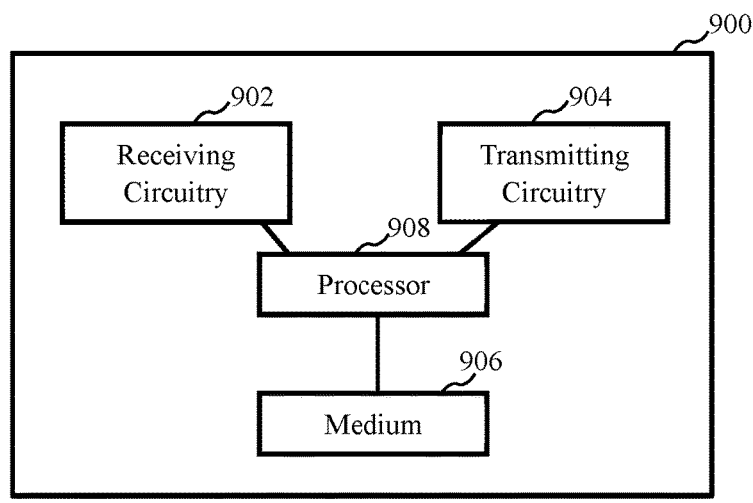
FIG. 9 illustrates an exemplary block diagram of an apparatus according to an embodiment of the present disclosure.

FIG. 9 illustrates an exemplary block diagram of an apparatus 900 according to an embodiment of the present disclosure. In some embodiments of the present disclosure, the apparatus 900 may be an EN management module or other devices having similar functionalities, which can at least perform the method illustrated in any of FIGS. 3-5 and 7.

As shown in FIG. 9, the apparatus 900 may include at least one receiving circuitry 902, at least one transmitting circuitry 904, at least one non-transitory computer-readable medium 906, and at least one processor 908 coupled to the at least one receiving circuitry 902, the at least one transmitting circuitry 904, the at least one non-transitory computer-readable medium 906.

Although in FIG. 9, elements such as receiving circuitry 902, transmitting circuitry 904, non-transitory computer-readable medium 906, and processor 908 are described in the singular, the plural is contemplated unless limitation to the singular is explicitly stated. In some embodiments of the present disclosure, the at least one receiving circuitry 902 and the at least one transmitting circuitry 904 are combined into a single device, such as a transceiver. In certain embodiments of the present disclosure, the apparatus 900 may further include an input device, a memory, and/or other components.

In some embodiments of the present disclosure, the at least one non-transitory computer-readable medium 906 may have stored thereon computer-executable instructions which are programmed to cause the at least one processor 908 to implement the steps of the methods, for example as described in view of FIGS. 3-5 and 7, with the at least one receiving circuitry 902 and the at least one transmitting circuitry 904. For example, when executed, the instructions may cause the at least one processor 908 to determine a caching policy for caching a group of content items in a plurality of ENs, wherein determining the cache policy may include determining whether to cache a content item in an EN at least based on a popularity of the content item and a latency between the EN and a group of BSs. The instructions may further cause the at least one processor 908 to transmit a content indication to each EN of the plurality of ENs based on the determined caching polity respectively with the at least one transmitting circuitry 904, wherein the content indication transmitted to a respective EN may include one or more identifiers corresponding to one or more content items determined to be cached in the respective EN. For example, when executed, the instructions may cause the at least one processor 908 to receive a report including information on a latency between each EN of a plurality of ENs and a group of BSs with the at least one receiving circuitry 902. The instructions may further cause the at least one processor 908 to cluster the plurality of ENs based on the latency between each EN and the group of BSs.

Figure 10:
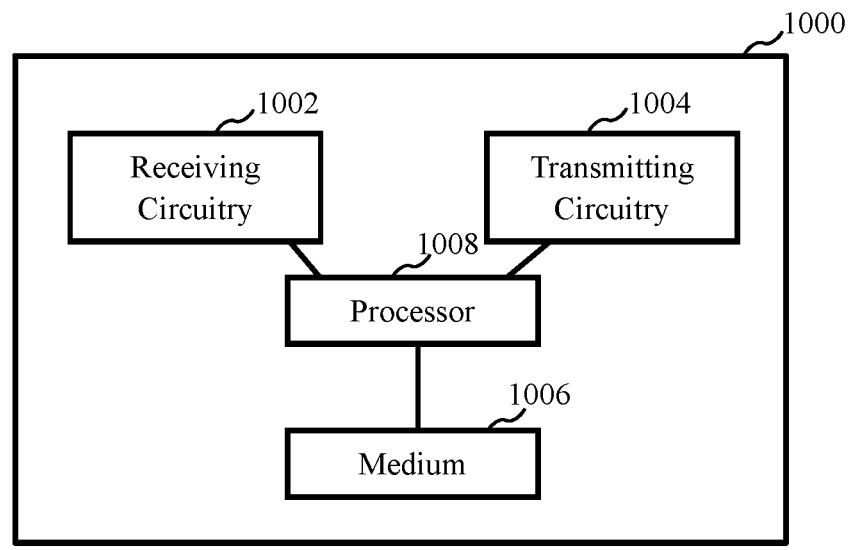
FIG. 10 illustrates an exemplary block diagram of an apparatus according to another embodiment of the present disclosure.

FIG. 10 illustrates an exemplary block diagram of an apparatus 1000 according to another embodiment of the present disclosure. In some embodiments of the present disclosure, the apparatus 1000 may be an EN discovery module or other devices having similar functionalities, which can at least perform the method illustrated in FIG. 8.

As shown in FIG. 10, the apparatus 1000 may include at least one receiving circuitry 1002, at least one transmitting circuitry 1004, at least one non-transitory computer-readable medium 1006, and at least one processor 1008 coupled to the at least one receiving circuitry 1002, the at least one transmitting circuitry 1004, the at least one non-transitory computer-readable medium 1006.

Although in FIG. 10, elements such as receiving circuitry 1002, transmitting circuitry 1004, non-transitory computer-readable medium 1006, and processor 1008 are described in the singular, the plural is contemplated unless limitation to the singular is explicitly stated. In some embodiments of the present disclosure, the at least one receiving circuitry 1002 and the at least one transmitting circuitry 1004 are combined into a single device, such as a transceiver. In certain embodiments of the present disclosure, the apparatus 1000 may further include an input device, a memory, and/or other components.

In some embodiments of the present disclosure, the at least one non-transitory computer-readable medium 1006 may have stored thereon computer-executable instructions which are programmed to cause the at least one processor 1008 to implement the steps of the methods, for example as described in view of FIG. 8, with the at least one receiving circuitry 1002 and the at least one transmitting circuitry 1004. For example, when executed, the instructions may cause the at least one processor 1008 to receive a request for a content item with the at least one receiving circuitry 1002. The instructions may further cause the at least one processor 1008 to determine an EN from a plurality of ENs to provide the content item based on the request and clustering information of the plurality of ENs, wherein the plurality of ENs are clustered at least based on a latency between each of the plurality of ENs and a group of BSs.

Figure 11:
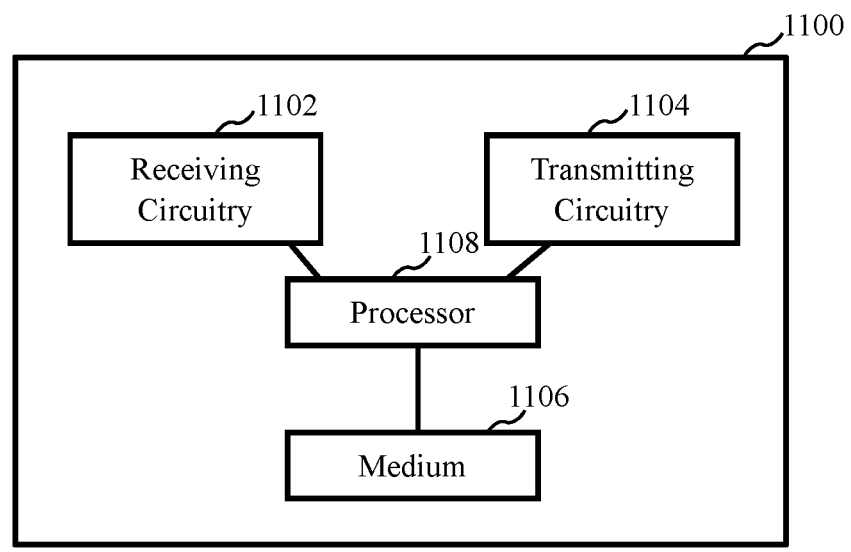
FIG. 11 illustrates an exemplary block diagram of an apparatus according to yet another embodiment of the present disclosure.

FIG. 11 illustrates an exemplary block diagram of an apparatus 1100 according to another embodiment of the present disclosure. In some embodiments of the present disclosure, the apparatus 1100 may be an EN or other devices having similar functionalities, which can at least perform the method illustrated in any of FIGS. 3-5, 7, and 8.

As shown in FIG. 11, the apparatus 1100 may include at least one receiving circuitry 1102, at least one transmitting circuitry 1104, at least one non-transitory computer-readable medium 1106, and at least one processor 1108 coupled to the at least one receiving circuitry 1102, the at least one transmitting circuitry 1104, the at least one non-transitory computer-readable medium 1106.

Although in FIG. 11, elements such as receiving circuitry 1102, transmitting circuitry 1104, non-transitory computer-readable medium 1106, and processor 1108 are described in the singular, the plural is contemplated unless limitation to the singular is explicitly stated. In some embodiments of the present disclosure, the at least one receiving circuitry 1102 and the at least one transmitting circuitry 1104 are combined into a single device, such as a transceiver. In certain embodiments of the present disclosure, the apparatus 1100 may further include an input device, a memory, and/or other components.

In some embodiments of the present disclosure, the at least one non-transitory computer-readable medium 1106 may have stored thereon computer-executable instructions which are programmed to cause the at least one processor 1108 to implement the steps of the methods, for example as described in view of FIGS. 3-5, 7, and 8, with the at least one receiving circuitry 1102 and the at least one transmitting circuitry 1104. For example, when executed, the instructions may cause the at least one processor 1108 to transmit a report including information on a latency between an EN and a group of BSs with the at least one transmitting circuitry 1104. The instructions may further cause the at least one processor 1108 to receive a caching policy indicating at least one content item to be cached in the EN with the at least one receiving circuitry 1102.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by an edge node management module, the method comprising:
   receiving a latency report that includes information about a latency between an edge node and a group of base stations;
   determining a caching policy for caching one or more content items in a plurality of edge nodes, wherein determining the caching policy includes determining whether to cache a content item in the edge node based at least in part on a popularity of the content item and the latency; and
   transmitting a content indication to each edge node of the plurality of edge nodes based on the caching policy, the content indication including one or more identifiers corresponding to the one or more content items determined to be cached in a respective edge node.

2. The method of claim 1, further comprising transmitting the caching policy to an edge node discovery module.

3. The method of claim 1, wherein the latency between the edge node and the group of base stations includes at least one of a latency between the edge node and a base station in the group of base stations, or an average latency between the edge node and all base stations in the group of base stations.

4. The method of claim 1, wherein determining the caching policy comprises:
   clustering the plurality of edge nodes based on the latency between each edge node of the plurality of edge nodes and the group of base stations.

5. The method of claim 4, further comprising transmitting a result of clustering of the plurality of edge nodes to an edge node discovery module.

6. The method of claim 1, further comprising determining the caching policy based on at least one of a load capacity of the edge node or a load capacity of a cluster of edge nodes.

7. The method of claim 1, further comprising:
   transmitting a request for the latency report; and
   receiving the latency report based at least in part on the request.

8. The method of claim 1, further comprising:
   receiving a content list that includes an identifier and storage time of each content item cached in the edge node, and an average lifetime of the one or more content items cached in the edge node during a given time period.

9. An edge node management module for wireless communication, comprising:
- at least one memory; and
- at least one processor coupled with the at least one memory and configured to cause the edge node management module to:
  - receive a latency report that includes information about a latency between an edge node and a group of base stations;
  - determine a caching policy for caching one or more content items in multiple edge nodes, including to determine whether to cache a content item in the edge node based at least in part on a popularity of the content item and the latency; and
  - transmit a content indication to each edge node of the multiple edge nodes based on the caching policy, the content indication including one or more identifiers corresponding to the one or more content items determined to be cached in a respective edge node.

10. The edge node management module of claim 9, wherein the at least one processor is configured to cause the edge node management module to transmit the caching policy to an edge node discovery module.

11. The edge node management module of claim 9, wherein the latency between the edge node and the group of base stations includes at least one of a latency between the edge node and a base station in the group of base stations, or an average latency between the edge node and all base stations in the group of base stations.

12. The edge node management module of claim 9, wherein, to determine the caching policy, the at least one processor is configured to cause the edge node management module to cluster the multiple edge nodes based on the latency between each edge node of the multiple edge nodes and the group of base stations.

13. The edge node management module of claim 12, wherein the at least one processor is configured to cause the edge node management module to transmit a result of clustering the multiple edge nodes to an edge node discovery module.

14. The edge node management module of claim 9, wherein the at least one processor is configured to cause the edge node management module to determine the caching policy based on at least one of a load capacity of the edge node or a load capacity of a cluster of edge nodes.

15. The edge node management module of claim 9, wherein the at least one processor is configured to cause the edge node management module to:
- transmit a request for the latency report; and
- receive the latency report based at least in part on the request.

16. The edge node management module of claim 9, wherein the at least one processor is configured to cause the edge node management module to receive a content list that includes an identifier and storage time of each content item cached in the edge node, and an average lifetime of one or more content items cached in the edge node during a given time period.

17. A network edge node discovery module for wireless communication, comprising:
- at least one memory; and
- at least one processor coupled with the at least one memory and configured to cause the network edge node discovery module to:
  - receive a request from a user equipment (UE) for a content item;
  - receive a caching policy that indicates one or more edge nodes of a plurality edge nodes in which the content item is cached; and
  - determine an edge node from a plurality of edge nodes to provide the content item based at least in part on the request, the caching policy, and clustering information of the plurality of edge nodes, wherein the plurality of edge nodes are clustered based at least in part on a latency between each of the plurality of edge nodes and a group of base stations.

18. The network edge node discovery module of claim 17, wherein the at least one processor is configured to cause the network edge node discovery module to:
- transmit a request for the clustering information of the plurality of edge nodes;
- receive the clustering information of the plurality of edge nodes; and
- transmit a message indicating the edge node in response to the request for the content item.

19. The network edge node discovery module of claim 17, wherein the at least one processor is configured to cause the network edge node discovery module to:
- determine whether the content item is cached in a candidate edge node indicated in the request based on the caching policy to determine an edge node from the plurality of edge nodes to provide the content item;
- transmit an additional request to check a serving capacity of the candidate edge node in response to a determination that the content item is cached in the candidate edge node; and
- determine the candidate edge node to provide the content item in response to an indication that the serving capacity of the candidate edge node is sufficient to provide the content item.

* * * * *